J. Drummond,
Rotary Steam Engine.
Nº 1,273.      Patented Aug. 3, 1839.
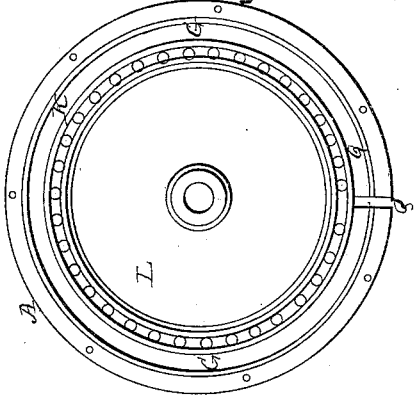
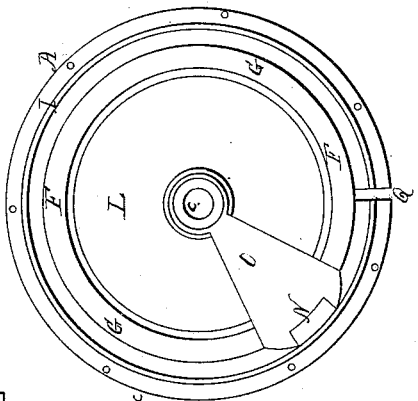
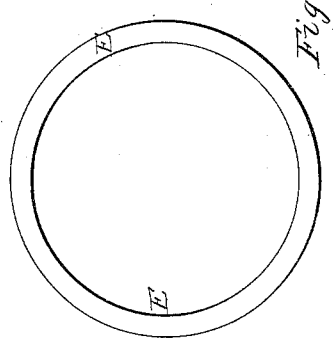
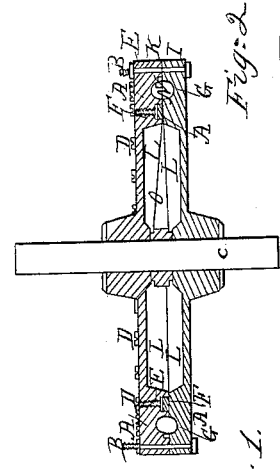
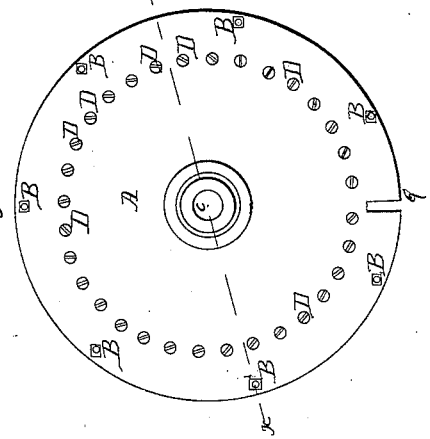
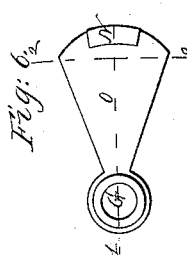
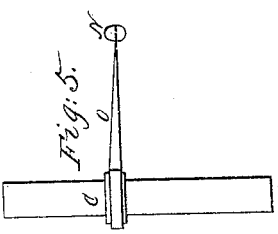

UNITED STATES PATENT OFFICE.

JOHN DRUMMOND, OF ELIZABETHTOWN, NEW JERSEY.

ROTARY STEAM-ENGINE.

Specification of Letters Patent No. 1,273, dated August 3, 1839.

*To all whom it may concern:*

Be it known that I, JOHN DRUMMOND, of Elizabethtown, in the county of Essex and State of New Jersey, have invented a new and useful Improvement in Rotary Steam-Engines, which is described as follows, reference being had to the annexed drawings of the same, making part of this specification.

The nature of this invention consists in constructing a stationary cylinder in two parts, in such a manner, with circular grooves, channels, or depressions, and circular projections, rims, or tongues, so that when the two parts, or halves, of the said cylinder are put together they form a tight cylinder containing a circular channel (oval or round in its cross section) in which there is driven around by steam, admitted through an aperture in the periphery of the cylinder, an oval or round head, or piston, fastened to the end of an arm projecting from an axle passing through the center of said cylinder, for conveying the power wherever desired, which arm is made thin toward its outer extremity, with razor shaped edges, to allow said arm to pass easily between a circular rim of elastic packing and a circular rim rising from the inside of one of the halves of the cylinder, upon which the packing is pressed by screws passing through the other end of the cylinder and turning against a circular ring of metal placed against the packing, said cylinder being made steam tight by letting a circular tongue on one end into a corresponding groove in the other end—the steam being discharged through an aperture in the periphery of said cylinder.

To enable persons skilled in the art of which this is a branch to make and use my engine I shall proceed to describe its construction and operation more particularly, having reference to the following enumerated drawings illustrative of the same:

Figure 1 represents the outside of the cylinder—the parts being all put together; Fig. 2, the inside of one half of the cylinder and that on which the circular rim is formed—against which the packing is pressed; Fig. 3, the inside of the other half of the cylinder containing the screws for tightening the packing, or pressing it against the rim, before mentioned, of the other half of the cylinder; Fig. 4, a cross section of the cylinder at the line *x x* of Fig. 1; Fig. 5, side view of the shaft or axle, arm and head or piston, which turn in the cylinder; Fig. 6, top view of ditto; Fig. 7, circular ring which is pressed upon the packing by the screws; Fig. 8, cross section of the arm at the line *z z* of Fig. 6 showing the flared edges.

Similar letters refer to similar parts in the figures—namely

A represents the outside of the stationary cylinder, made in two parts or halves A A, bolted together by screw bolts B—the ends of said cylinder being perforated in the center to admit the revolving shaft C to turn therein; and perforated on one end with a circle of perforations for screws D, which are to press against a circular ring E placed on a ring of packing which is pressed upon a circular rim F of the same diameter formed on the inside of the opposite half of the cylinder. Also a slot G in the periphery of the cylinder to admit a slide of the usual form which governs the admission and discharge of the steam. B screw bolts for confining the parts of the cylinder together. C revolving shaft to which the piston-arm is fixed. D screws for confining the packing—said screws being arranged in a circle of the same diameter as the ring and the ring of packing, and the rim upon or against which it is pressed. E the ring placed upon the packing. F rim on the inside of one half of the cylinder against which the ring of packing is pressed by the screws D. G circular channel for the piston or enlarged end or head of the arm to move around in—half of which channel (of a semi-circular or semi-oval shape) in one end plate of the cylinder—and the other half (of a similar shape) being made in the other end plate of the cylinder—so that when the plates are put together a circular channel is formed, whose cross section will be a circle or an oval. In this channel a head or piston of a similar shape in its cross section is driven around by the steam admitted at the periphery of the cylinder. Said head or piston is fastened to the end of an arm *o* inserted into or otherwise fastened to the revolving shaft C at right angles. This arm, in its plan, is made as represented at O Fig. 6—that is to say circular and thick (edgewise) at the end through which the axle C passes and to which axle said arms is permanently fastened, and at the other end it is made the segment of a circle and thin, to which end the head or piston N is secured—and the sides of said arm are straight from the extremities of the segment of a circle and point toward the center of the aperture in the smaller or circular end. Said arm in its vertical longitudinal section is made in the manner represented in Fig. 5—that is to say flat on the under side where it moves around on the circular rim F and inclined on the upper side which comes in contact with the packing, rising from the thin part, or piston end, toward the circular end, through which the axle passes, at any suitable angle, until it meets the circumference of said circular end which is flat on the upper side as well as the under side, and thus this end is rendered thick and strong where the shaft or axle passes through, as it should be, and thin and flaring at the part which passes between the packing and rim, and from the center of said arm (looking down upon it as in Fig. 6) it is flared or sloped off to the right and left as represented at the cross sections Fig. 8—leaving the arm a little thicker in the middle at the line 1 1 than at its edges, which are made as thin as the cutting edge of a razor for the purpose of lifting the packing from the rim gradually and passing between them as it is pushed or forced around on the rim by the steam and without suffering the steam to escape through between said packing and rim at the edges of said arm, as the packing is thus raised from the rim to suffer the arm to pass around in its circular course, and this object is accomplished by the elasticity of the packing and the ring and screws which compress the same; for the power of the steam in driving the arms will force the packing to yield sufficient, or be still more compressed, to allow the arm to move and the instantaneous extension of the packing at the edge of the arm toward the entrance of steam will effectually prevent the escape of a sufficient quantity of steam to the center of the cylinder, so as to pass to the opposite side of the piston, to retard materially, if at all, the rotary movement of the piston.

In one of the plates outside of said circular channel there is formed a circular groove K into which fits a circular tongue I or projection formed on the outside of the other half of the circular channel for making a close joint. The inside of the cylinder between the rim and axle at L is made hollow to allow the arm to play freely without touching any part, except the rim and packing between which said arm passes around in a circle.

The steam is admitted and discharged in the usual manner of rotary steam engines.

I do not claim as my invention the head or piston revolving in a groove and attached to a rotating shaft, as this has long been known; but heretofore the attachment has been made by means of a disk.

I therefore limit my claim to—

The mode of attaching the revolving head or piston to the rotating shaft by means of an arm of the form herein described, and for the purpose set forth.

JOHN DRUMMOND.

Witnesses:
ELIHU HARRISON,
JOHN J. BRYANT.